Dec. 10, 1946.     T. R. ARDEN     2,412,195
INTERNAL-COMBUSTION ENGINE
Filed Dec. 10, 1943     5 Sheets-Sheet 1
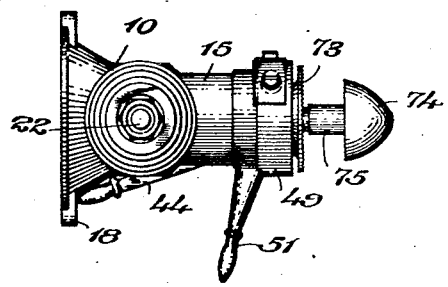
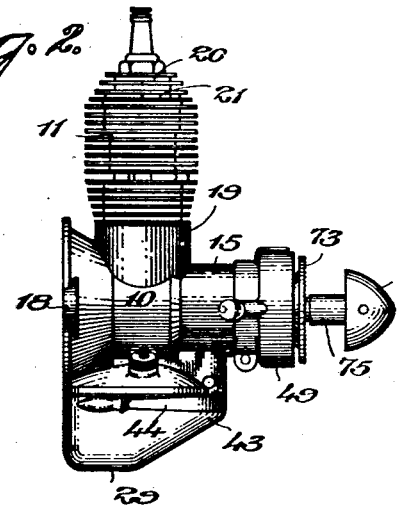
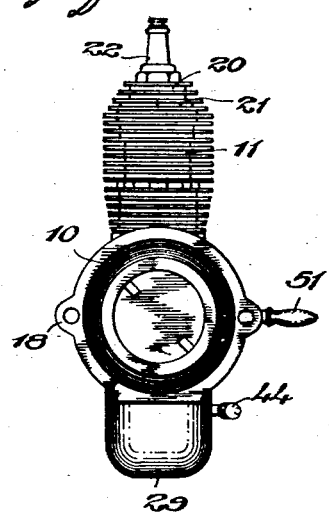
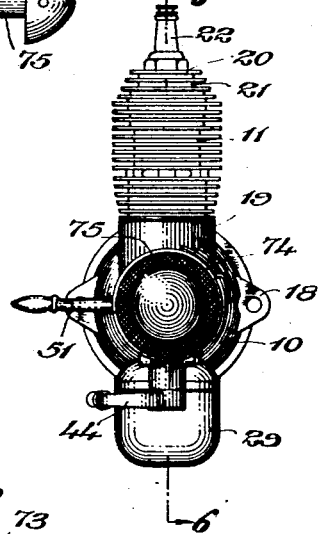
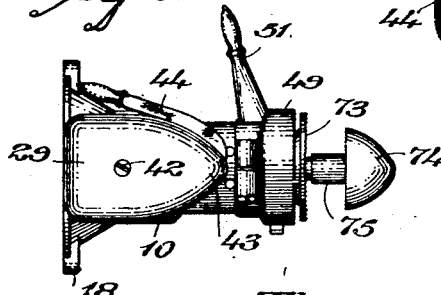
INVENTOR
Thomas R. Arden
by Nothaupter & Groff
HIS ATTORNEYS Dec. 10, 1946.    T. R. ARDEN    2,412,195
INTERNAL-COMBUSTION ENGINE
Filed Dec. 10, 1943    5 Sheets-Sheet 2
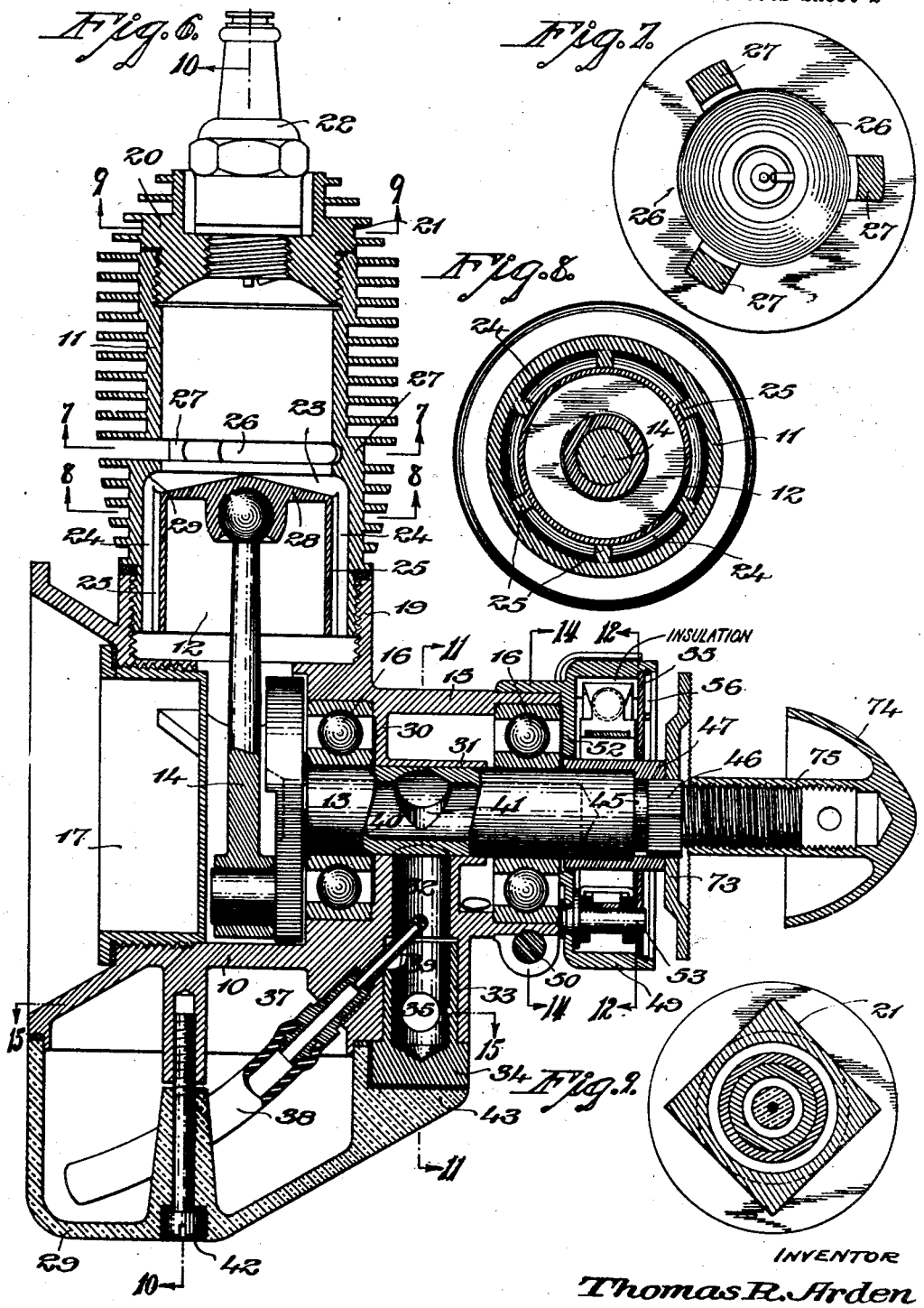
INVENTOR
Thomas R. Arden
BY Holhaupter & Groff
HIS ATTORNEYS

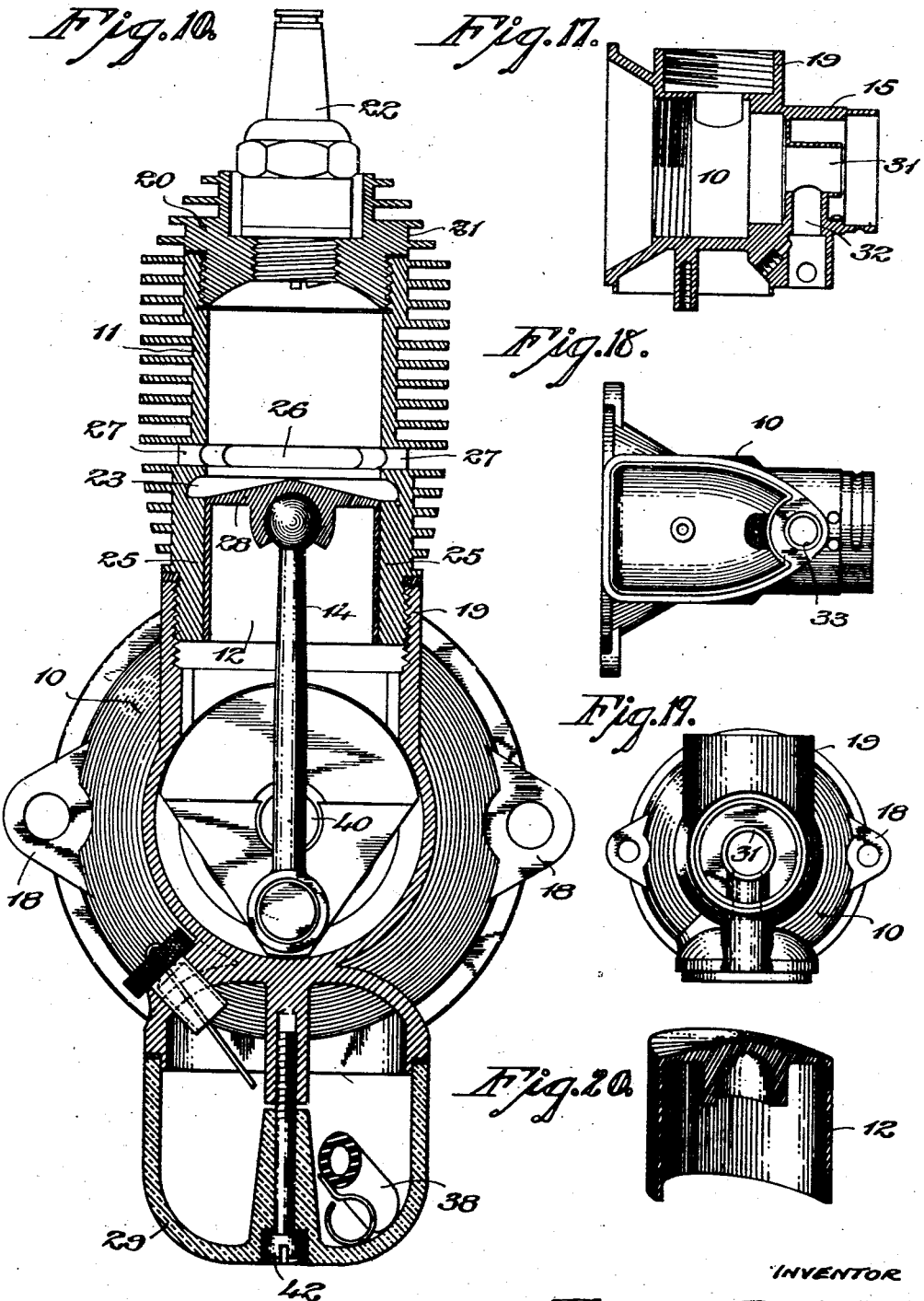

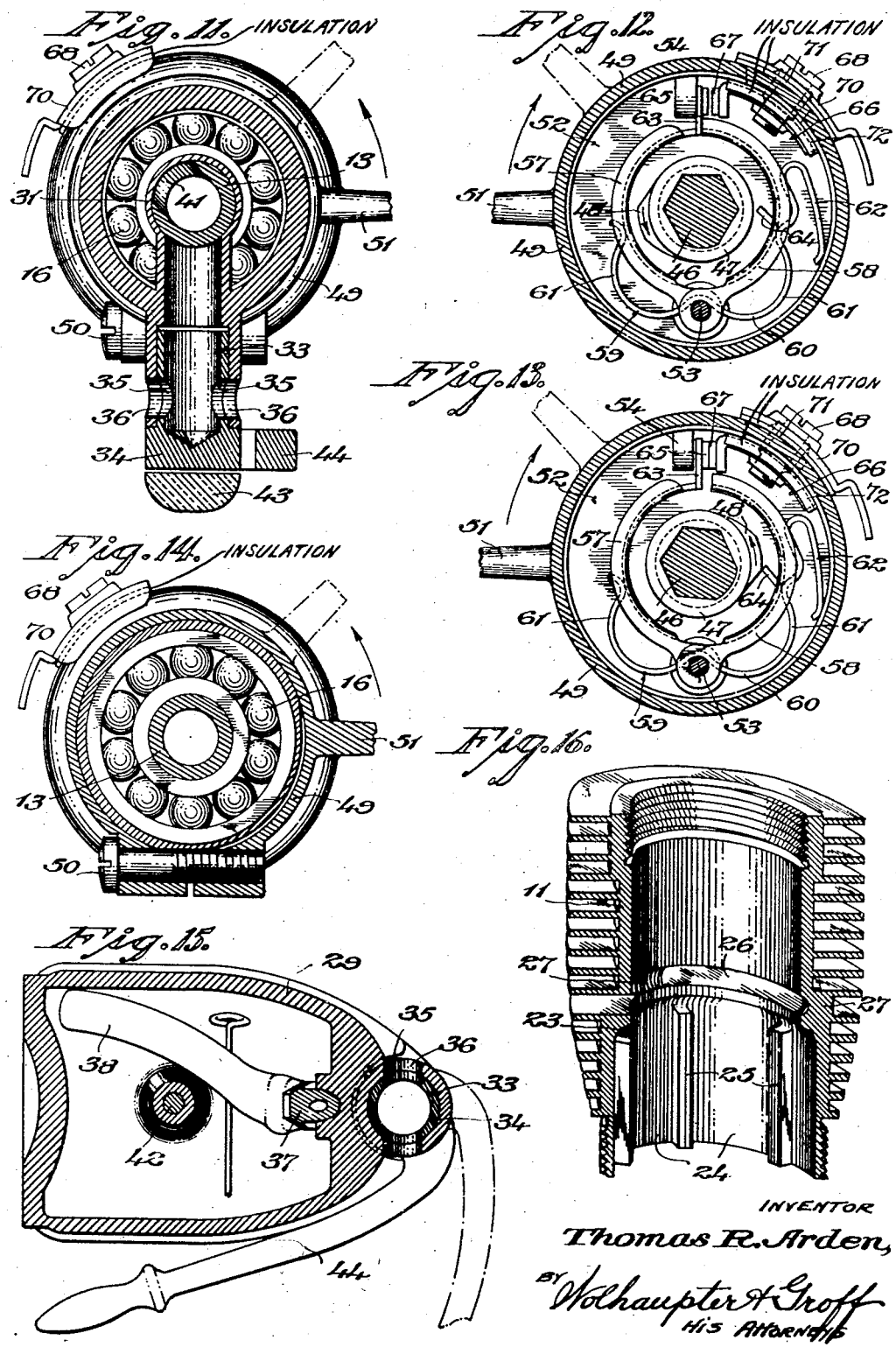

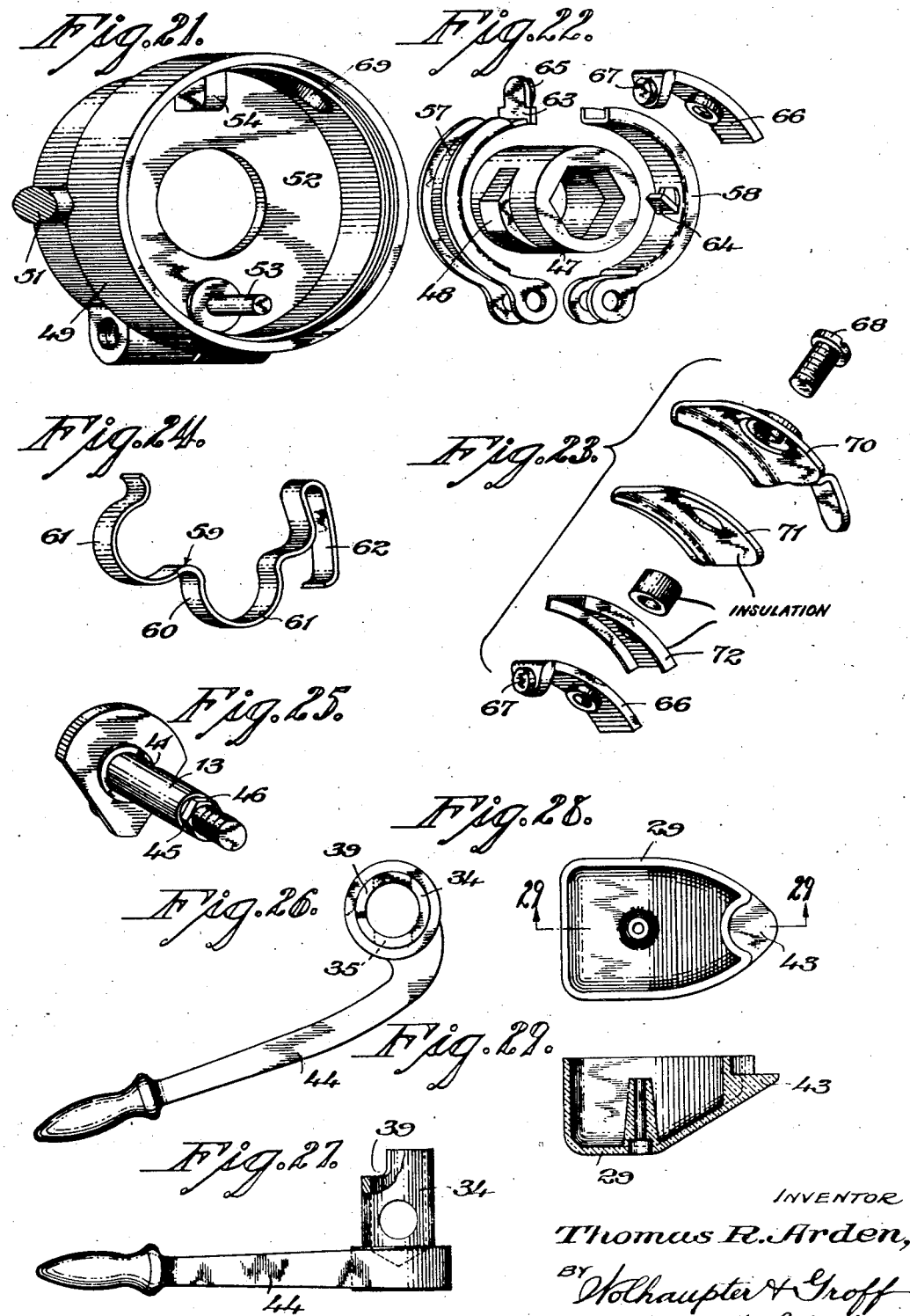

Patented Dec. 10, 1946

2,412,195

UNITED STATES PATENT OFFICE 2,412,195

INTERNAL-COMBUSTION ENGINE

Thomas R. Arden, Danbury, Conn., assignor to Bard-Parker Company, Inc., Danbury, Conn., a corporation of New York Application December 10, 1943, Serial No. 513,752

4 Claims. (Cl. 123—73)

This invention relates to internal combustion engines, and has for one of its special and more important objects to provide an internal combustion engine of the spark ignition two-stroke-cycle type embodying novel inlet and exhaust port or passageway means to insure the supply of full charges of explosive gases to the engine cylinder, or cylinders, and the thorough exhaust of burnt gases therefrom.

More particularly, the invention has in view in the foregoing connection to provide an internal combustion engine of the type mentioned embodying inlet and exhaust port or passageway means of novel form and arranged relatively to each other so that the incoming explosive gases are delivered into the cylinder, or cylinders, in a manner to effect thorough expulsion of burnt gases therefrom.

While an engine constructed in accordance with the invention is capable of general use, one particular use thereof is for powering miniature aircraft, in which connection another special and important object of the invention is to provide a fuel tank which is combined in streamlined manner with the crank case of the engine.

Another object of the invention is to provide a simple valve for regulating the supply of fuel and combustion supporting air to the engine and to mount this valve in a practical manner relative to the engine.

Another object of the invention is to provide a highly efficient, quickly acting timer for controlling operation of the spark plug, or plugs, of the engine and to mount said timer in a practical manner upon the engine.

Another object of the invention is to provide an engine embodying a design such that it may be produced at comparatively low cost.

With the foregoing and other objects in view, which will become more fully apparent as the nature of the invention is better understood, the same consists in an engine embodying the novel features of construction, combination, and arrangement of parts as will be hereinafter more fully described, illustrated in the accompanying drawings and defined in the appended claims.

In the accompanying drawings, wherein like characters of reference denote corresponding parts in related views:

Figure 1 is a top plan view of an engine constructed in accordance with the invention.

Figure 2 is a side elevation of the engine.

Figure 3 is a rear elevation of the engine.

Figure 4 is a front elevation of the engine.

Figure 5 is a bottom plan view of the engine.

Figure 6 is a central, vertical, longitudinal section through the engine.

Figure 7 is a cross section on the line 7—7 of Figure 6.

Figure 8 is a cross section on the line 8—8 of Figure 6.

Figure 9 is a cross section on the line 9—9 of Figure 6.

Figure 10 is a central, vertical, transverse section through the engine.

Figure 11 is a section on the line 11—11 of Figure 6.

Figure 12 is a section on the line 12—12 of Figure 6 showing the timer parts in circuit-open positions.

Figure 13 is a view similar to Figure 12 showing the timer parts in circuit-closed positions.

Figure 14 is a cross section on the line 14—14 of Figure 6.

Figure 15 is a section on the line 15—15 of Figure 6.

Figure 16 is a sectional, perspective view of the engine cylinder.

Figure 17 is a central, vertical, longitudinal section through the crank case of the engine.

Figure 18 is a bottom plan view of the crank case of the engine.

Figure 19 is a front elevation of the crank case of the engine.

Figure 20 is a sectional, perspective view of the engine piston.

Figure 21 is a perspective view of the timer casing.

Figure 22 is a perspective view of the timer cam, breaker arms and the fixed contact element in separated relationship to each other.

Figure 23 is a separated perspective view of the fixed contact element and its associated insulating and mounting elements.

Figure 24 is a perspective view of the timer spring.

Figure 25 is a perspective view of the crank shaft of the engine.

Figure 26 is a plan view of the fuel and air control valve.

Figure 27 is a side elevation of the fuel and air control valve.

Figure 28 is a top plan view of the fuel tank; and

Figure 29 is a section on the line 29—29 of Figure 28.

The engine illustrated in the drawings is especially designed for powering miniature aircraft. It is to be understood, however, that some or all of the features thereof may be embodied in an engine to be used for any other purpose. It will also be understood that the engine may comprise only a single cylinder, as shown, or any desired plurality of cylinders.

Primarily, the present engine comprises, as usual, a crank case 10, a cylinder 11, a piston 12, a crank shaft 13, and a rod 14 connecting said piston 12 with said crank shaft 13.

Generally speaking, the crank case 10 is of circular shape in cross-section and includes a forwardly extending cylindrical portion 15 in which the crank shaft 13 is journaled, preferably through the instrumentality of anti-friction bearings 16. In the rear end of the crank case is an opening through which the crank shaft 13 may be inserted into the cylindrical portion 15, but normally this opening is closed by a removable plug 17. Moreover, the rear end portion of said crank case is flared to merge into the front end portion of the fuselage of an aircraft upon which the engine is to be mounted, and said rear end portion is provided with bolting lugs 18 or any other suitable means to facilitate fastening of the engine to the aircraft fuselage. However, depending upon the particular use to which the engine is to be put, the same may be provided with any other suitable means to facilitate mounting thereof upon any other base or supporting structure.

The cylinder 11 may be either integral with or separate from the crank case 10. Preferably, however, for economy and facility of manufacture, it is separate from said crank case, being fastened to said crank, for example, by being threaded at its inner or lower end into a boss 19 formed as a part of said crank case. The head 20 of said cylinder likewise may be either integral with or separate from said cylinder, but likewise for facility and economy of manufacture it preferably is separate from said cylinder, being fastened to said cylinder, for example, by being threaded into the outer end of the latter. In this connection and as illustrated in Figure 9, the said head 20 may be provided with a polygonal portion 21 to be engaged by a wrench to facilitate threading of the same into and from the cylinder. Moreover, said head 20 may carry a spark plug 22 for igniting charges of fuel supplied to the cylinder 11.

The present engine is, as aforesaid, of the two-stroke-cycle type. Moreover, it is of the two-stroke-cycle type in which the gaseous fuel is compressed in the crank case 10 by inward movement of the piston and is delivered to the cylinder between the head thereof and the head of the piston 12 through a port 23, which is uncovered by the piston 12 as the latter reaches its limit of inward movement in the cylinder. In this connection it will be observed that said port is in the form of a channel in the inner side of the cylinder wall and extends completely and uninterruptedly around said cylinder and opens into the latter. It will further be observed that said port is in constant communication with the interior of the crank case 10 through a series of channels 24 which are formed in the inner side of the cylinder wall and extend longitudinally of the cylinder between its inner end and said port. Between these channels 24 are ribs 25 by which the piston 12 is guided with little friction in its movement in the inner end portion of the cylinder.

Directly above or outwardly of the inlet port 23 the cylinder 11 has formed therethrough a plurality of exhaust ports 26 between which are webs 27 by which the inner and the outer portions of the cylinder are tied together. However, the webs 27 are of narrow widths and have their inner faces spaced outwardly from the inner face of the cylinder 11. Therefore, the exhaust ports 26 are connected together at their ends and to all intents and purposes, collectively constitute a single port extending continuously around and through the cylinder 11, thereby permitting free escape of burnt gases in all directions from said cylinder.

Assuming compression of a charge of gaseous fuel in the crank case 10 each time the piston 12 moves inwardly, it is apparent that when the inlet port 23 is uncovered by said piston the compressed fuel will be delivered from the crank case through its channels 24 and said port 23 into the cylinder 11 outwardly of the piston 12 entirely around the head 28 of said piston 12 in the form of a hollow, circular stream which will be directed laterally inward toward the axis of the cylinder by the preferably rounded surface 29 defining the top of the inlet port 23. It will further be apparent that this hollow, inwardly directed stream concentrates along the axis of the cylinder in a solid stream flowing longitudinally outward through the cylinder and that this solid stream, by contact with the cylinder head 20, will be turned laterally outward and thereby be caused to flow longitudinally inwardly in the cylinder along the sides thereof, in the form of a hollow, circular stream which will effectively force substantially all burnt gases from the cylinder through the exhaust ports 26.

By the time substantially all burnt gases have been exhausted from the cylinder and before any of the incoming gaseous fuel has had a chance to escape from the cylinder through the exhaust ports 26, the piston 12 will have begun its outward stroke and both the inlet and the exhaust ports will have been closed. The charge of fuel delivered into the cylinder thereupon will be compressed in the cylinder and will be ignited by the spark plug 22 as the piston nears the end of its outward stroke. Explosion of the compressed fuel charge will drive the piston inwardly and the recounted operation thereupon will be repeated.

It will be noted that the top face of the head 28 of the piston 12 is of flattened conical form. As the gaseous fuel enters the cylinder through the inlet port 23, it is deflected by the said flattened conical top face of the head 28 longitudinally outwardly along the axis of the cylinder and this greatly assists in causing the fuel to follow the desired path of flow set forth with its consequent effective forcing of burnt gases from the cylinder. In this connection experiments have demonstrated that an angle of approximately 12° of the conical upper face of the head of the piston is most effective in causing the gaseous fuel to flow in the described, desired manner, the overall effect being that the cylinder is effectively cleansed of burnt gases and receives a full charge of fuel during each cycle of the engine with the result that the efficiency of the engine is exceptionally high.

Any suitable means may be provided for supplying gaseous fuel to the crank case 10. If, however, the engine is to be used for powering a miniature aircraft, a tank 29 for liquid fuel preferably is mounted at the bottom of the crank case 10 and suitable means is provided whereby liquid fuel is drawn from said tank and is mixed with air to provide a gaseous fuel and the latter is drawn into the crank case during each outward stroke of the piston 12. In this connection it will be noted that the crank case 10 is closed at its front end by a wall 30, that a sleeve 31 extends forwardly from this wall in surrounding relationship to the shaft 13, and that a gaseous fuel duct 32 extends to the interior of said sleeve 31 from the top of a valve chamber 33 in the form of an open-bottom, vertical bore in the front, lower portion of the crank case 10. It will further be noted that a hollow, cylindrical valve 34 is rotatably mounted in the chamber 33, that this valve is open at its upper end and closed at its lower end, and that said valve and the wall defining the chamber 33 are provided in their sides with air admission ports 35 and 36, respectively, for alinement with and disalinement from each other by rotation of said valve. Additionally, it will be noted that a liquid fuel supply nozzle 37 is threaded in the crank case 10, that a short length of flexible tubing 38 leads from the bottom of the fuel tank 29 to the inlet end of said nozzle, and that the outlet end portion of said nozzle extends through a circumferential slot 39 in the valve 34 into the duct 32. Finally, it will be noted that the inner end portion of the crank shaft 13 is provided with a bore 40 opening through its inner end into the crank case 10, that said shaft additionally is provided with a port 41 affording communication between the exterior thereof and the bore 40, and that said port 41 is disposed to be alined with the duct 32 once during each complete rotation of the crank shaft 13 at a time when the piston 12 is moving outwardly in the cylinder 11.

From the foregoing it will be apparent, assuming an alined relationship of the ports 35, 36, that each time the piston 12 moves outwardly, a mixed charge of liquid fuel and air will be drawn into the crank case 10 and that each time the piston moves inwardly the fuel supply will be cut off so that the charge in the crank case will be compressed therein for delivery into the cylinder 11 in the manner heretofore recounted.

The air admission ports 35, 36 are located outwardly with respect to the nozzle 37 so that the air drawn through said ports flows over said nozzle and causes fuel to be drawn therefrom. This relationship of said ports and said nozzle also insures an effective mixing of the air with the liquid fuel. By rotatably adjusting the valve 34 to vary the effective areas of the ports 35, 36, the richness of the fuel mixture may obviously be regulated as desired.

The fuel tank 29 is of open-top form and is closed at its top by the crank case 10 of the engine when it is mounted thereon. It may be detachably mounted on the crank case in any suitable manner as, for example, by means of a screw 42 extending therethrough into a threaded opening in the crank case.

At the front of the fuel tank 29 is a lip 43 which underlies the closed, lower end of the valve 34 and thereby retains said valve in the chamber 33. Any other means may, however, be provided to retain said valve in said chamber. Moreover, said valve may be rotatable through an angle of 360° or any suitable means may be provided to limit its rotation to an angle no greater than is required to close and open the ports 35, 36. In this connection, the slot 29 may be of a length such that the walls defining its ends, by contact with the nozzle 39, limit its rotation to an angle no greater than is required to aline and disaline the ports 35, 36. On the lower end portion of said valve is a suitable handle 44 for effecting its rotation.

As viewed in plan, the rear portion of the tank 29 is of rectangular shape and its front portion converges toward its front end. On the other hand, as viewed in side elevation, the rear portion of said tank is of rectangular shape and its front portion is inclined upwardly to its front end. The lower portion of the crank case 10 against which said tank is fastened and which constitutes a cover for the open top of said tank, is of the same shape in plan as said tank and merges into said crank case. Accordingly, the said lower portion of the crank case and the fuel tank cooperate to impart a practical streamlined shape to the bottom portion of the engine.

The crank shaft 13 extends forwardly beyond the front end of the cylindrical portion 15 of the crank case 10 and its front end portion is of reduced diameter, thus providing said shaft with an annular, forwardly facing shoulder 45. On the reduced-diameter portion of said shaft, adjacent to the shoulder 45, is a polygonal formation 46, while engaged partly over the larger diameter portion and partly over the smaller diameter portion of said shaft is a sleeve 47 having a rearwardly facing shoulder which engages the shoulder 45 whereby movement thereof rearwardly relative to the shaft 13 is limited. Moreover, the opening in the front end portion of said sleeve is of the same cross-sectional shape as the polygonal formation 46 and accommodates said polygonal formation, thus constraining said sleeve to rotate with said shaft. On the exterior of the sleeve 47 is a lug 48 constituting a cam for actuating the timer of the engine.

The timer mechanism is enclosed in a cylindrical housing 49 which is mounted for rotative adjustment on the forward end of the cylindrical portion 15 of the crank case 10. The rear portion of said housing embraces the crank case portion 15, is longitudinally split, and is provided with a screw 50 whereby it may be clamped sufficiently tight upon said crank case portion 15 so that it will frictionally be held in any position to which it may be rotatably adjusted. For effecting its rotative adjustment, the housing 49 is provided with a suitable handle 51.

Within the housing 49 is a transverse wall 52 which closes the front end of the crank case portion 15 and which has fixed thereto and extending forwardly therefrom a pin 53, while at a point approximately diametrically opposite the pin 53, said housing 49 has fixed thereto and projecting into the same an abutment 54. At its front end, the housing 49 is closed by a removable plate 55 which may be retained in assembly with said housing in any suitable manner as, for example, by means of a split ring 56.

Within the housing 49 is a pair of breaker arms 57 and 58 of substantially semi-circular shape which are pivoted at adjacent ends on the pin 53 for independent rocking movement thereon and which have their other ends free and disposed adjacent to the abutment 54. A suitable spring 59 of the leaf type tends constantly to rotate the arms 57, 58 toward one another about the pin 53, thus to cause their free ends normally to abut one another, and either this same spring or, if desired, another spring, tends to rock both of said arms as a unit in one direction about said pin 53. In the present instance, the one spring 59 performs both of these functions, said spring being bent to shape from a length of suitable spring material and including a substantially U-shaped portion 60 medially engaged with the pin 53 and having its legs 61 embracing the breaker arms 57, 58 to perform the first-mentioned function, and further including a reversely bent terminal extension 62 of one of its legs 61 engaged with the inner face of the housing 49 whereby it performs the second-mentioned function.

The leading breaker arm, as regards the direction of unitary rocking movement of the two breaker arms by the spring 59, is provided at its free end with an outwardly extending tongue 63 for engagement with the abutment 54 whereby its rocking movement by said spring 59 is limited. Thus, said leading breaker arm, which is the arm 57 in the present instance, is held by the spring 59 normally in a position with its tongue 63 in engagement with the abutment 54. At the same time, the other or trailing breaker arm, as regards the direction of unitary rocking movement of the two breaker arms by the spring 59 and which is the arm 58 in the present instance, normally is held by said spring 59 with its free end in engagement with the free end of the arm 57.

Extending inwardly from the trailing breaker arm 58 into the path of rotation of the cam lug 48 is a suitable projection 64 which, appropriately, may be in the form of a tongue struck inwardly from said breaker arm 58. In any event, regardless of the form of said projection 64, it is apparent that, once during each complete rotation of the shaft 13 and of the cam sleeve 47 which is carried by and rotatable therewith, said projection 64 will be engaged by the cam lug 48 with the result that the trailing breaker arm 58 will be rocked a limited distance in a direction counter to the direction in which it is urged by the spring 59.

On the tongue 63 is a back contact 65, while carried by the timer housing 49 is a plate 66 which carries a front or fixed contact 67 with which the back contact 65 cooperates, the plate 66 being positioned so that when the tongue 63 is engaged with the abutment 54, the said front contact 67 is spaced from the back contact 65 by an amount less than the amount of rocking movement which is imparted to the free end of the breaker arm 58 by the cam lug 48. Manifestly, therefore, each time the trailing breaker arm 58 is rocked by the cam lug 48, the other or leading breaker arm 57 is rocked therewith by the spring 59 until the back contact 65 engages the front contact 67, whereupon rocking movement of said leading breaker arm is arrested with the result that the free end of the trailing breaker arm is moved into spaced relationship to the free end of said leading breaker arm, as shown in Figure 13. Consequently, when the cam lug 48 passes the projection 64 and thereby suddenly releases both of the breaker arms 57, 58 for return to their normal positions by the spring 59, the free end of the trailing breaker arm 58 is caused to strike the free end of the leading breaker arm 57 a hammer-like blow which effects exceptionally quick separation of the contact 65 from the contact 67.

It will be understood, of course, that the contacts 65, 67 are included in a circuit which also includes the spark plug 22, and that due to the quick separation of said contacts 65, 67, sparking of the plug 22 is sharply defined and occurs at the intended instant even at exceptionally high speeds of the cam lug 48, with the result that exceptionally high engine speeds are attainable.

The plate 66 preferably is adjustable so that the distance between the contacts 65, 67 in their separated relationship may be varied. To this end, a screw 68 extends through a circumferentially elongated slot 69 in the side wall of the housing 49 and is threaded into a hole in said plate 66 whereby the latter may be shifted to adjust its contact 67 toward and away from the contact 65 and whereby it may be clamped in any adjusted position thereof against the said side wall of said housing. The screw 68 also serves to clamp a terminal plate 70 against the exterior of the housing 49, a sheet of insulation 71 being interposed between the plate 66 and said housing and another sheet of insulation 72 being interposed between the terminal plate 70 and said housing to prevent grounding through said housing of that side of the circuit which includes the contacts 65, 67.

Obviously, the present timer not only is quickly acting in its operation, but is compact and is mounted in a practical manner relative to the engine. Moreover, it is strong and sturdy and embodies a simple construction such that it is unlikely to get out of order, despite long service. Obviously, by rotatably adjusting the housing 49, the time of actuation of the timer may be varied.

A disk 73 having a central opening corresponding in size and shape to the polygonal portion 46 of the crank shaft 13 is engaged on said polygonal portion and serves as a back support for a propeller or the like (not shown), which is clamped between said disk and a nut 74 threaded on the front end of said shaft 13. The cam sleeve 47 serves as an abutment limiting rearward movement of the disk 73 and itself is retained in its rearmost or operative position relative to the shaft 13 by the nut 74 when a propeller or the like is clamped by said nut against said disk. Preferably, but not necessarily, the nut 74 is of the form shown including a hollow, internally threaded shank 75 engaged over the externally threaded front end portion of the shaft 13.

The engine may be either air cooled or liquid cooled and various departures from the specific structure shown and described obviously may be resorted to within the spirit and scope of the invention as defined in the appended claims.

I claim:

1. An internal combustion engine including a crank case, a cylinder, and a piston reciprocable in said cylinder, said cylinder having a fuel inlet port extending continuously entirely therearound and opening into the same to be uncovered by said piston when the latter reaches approximately its innermost limit of movement in said cylinder, said cylinder further having channels affording communication between the crank case and said inlet port for flow of fuel from the former to the latter, said channels opening at their inner sides into said cylinder.

2. An internal combustion engine including a crank case, a cylinder, and a piston reciprocable in said cylinder, said cylinder having a fuel inlet port extending continuously entirely therearound and opening into the same to be uncovered by said piston when the latter reaches approximately its innermost limit of movement in said cylinder, said cylinder further having channels affording communication between the crank case and said inlet port for flow of fuel from the former to the latter, the wall defining the side of said port nearer the head of said cylinder being shaped to deflect the incoming fuel laterally inward toward the axis of said cylinder, said channels extending longitudinally of said cylinder and opening at their inner sides into the same, and ribs between said channels by which said piston is supported and against which it slides at its sides, said ribs terminating at their outer ends inwardly of said annularly continuous inlet port.

3. An internal combustion engine including a crank case, a fuel tank mounted on said crank case, means for the supply of fuel from said tank to said crank case, and a valve for controlling the supply of combustion supporting air to the fuel during its flow to said crank case, said fuel tank having a portion cooperating with said valve to retain the same in assembly with the engine.

4. An internal combustion engine including a crank case, a fuel tank removably mounted on said crank case, passage-way means for flow of fuel from said fuel tank to said crank case, a manually adjustable valve for regulating supply of combustion supporting air to said passage-way, said valve being removably mounted in said crank case and being retained therein by a portion of said fuel tank.

THOMAS R. ARDEN.